US010961094B2

(12) United States Patent
Rauwolf

(10) Patent No.: US 10,961,094 B2
(45) Date of Patent: Mar. 30, 2021

(54) DRIVERLESS TRANSPORT SYSTEM

(71) Applicant: HAWE Altenstadt Holding GmbH, Altenstadt (DE)

(72) Inventor: Martin Rauwolf, Schongau (DE)

(73) Assignee: HAWE Altenstadt Holding GmbH, Altenstadt (DE)

(*) Notice: Subject to any disclaimer, the term of this patent is extended or adjusted under 35 U.S.C. 154(b) by 0 days.

(21) Appl. No.: 16/522,621

(22) Filed: Jul. 25, 2019

(65) Prior Publication Data

US 2020/0031639 A1    Jan. 30, 2020

(30) Foreign Application Priority Data

Jul. 27, 2018    (DE) .................... 10 2018 118 261.9

(51) Int. Cl.
*B66F 7/08* (2006.01)
*B66F 9/06* (2006.01)
(Continued)

(52) U.S. Cl.
CPC .............. *B66F 7/08* (2013.01); *B65G 1/0492* (2013.01); *B65G 1/065* (2013.01); *B66F 9/063* (2013.01);
(Continued)

(58) Field of Classification Search
CPC .......... B66F 7/08; B66F 9/063; B65G 1/0492; B65G 1/065; G05D 2201/0216; G05D 1/0297; G05D 1/021
See application file for complete search history.

(56) References Cited

U.S. PATENT DOCUMENTS 9,707,879 B2 *   7/2017   Mecklinger ............. B66F 9/063
9,823,662 B2 *  11/2017   Mecklinger ........... B60P 1/6409
(Continued)

FOREIGN PATENT DOCUMENTS

DE      28 05 455 A1     8/1978
DE   102011089858 A1     6/2013
FR     2 608 142 A1      6/2018

OTHER PUBLICATIONS

Machine Translation of FR 2 608 142 "Hydraulic Device for Raising and Lowering a Beam Platform Parallel to a Reference Plane" 1988 (Year: 1988).*

(Continued)

*Primary Examiner* — Kaitlin S Joerger
(74) *Attorney, Agent, or Firm* — Aslan Law, P.C.

(57) ABSTRACT

A lifting device comprises a delivery direction-reversible hydraulic unit and at least three hydraulic lifting cylinders. The hydraulic cylinders are dimensioned in a stepped manner in such a way that the piston rod working space of an n-th lifting cylinder and the piston working space of an (n+1)-th lifting cylinder, with n from 1 to z−1, wherein z indicates the number of hydraulic lifting cylinders of the lifting device, have the same effective area. The at least three lifting cylinders are hydraulically connected in series in such a way that the respective working spaces with the same effective area are directly fluidically coupled by means of a hydraulic connection. The piston working space of the first lifting cylinder and the piston rod working space of the z-th lifting cylinder are in fluid connection with the connections of the delivery direction-reversible hydraulic unit.

12 Claims, 3 Drawing Sheets

(51) Int. Cl.
  *G05D 1/02* (2020.01)
  *B65G 1/06* (2006.01)
  *G05D 1/00* (2006.01)
  *B65G 1/04* (2006.01)

(52) U.S. Cl.
  CPC ........... *G05D 1/0022* (2013.01); *G05D 1/021* (2013.01); *G05D 2201/0216* (2013.01)

(56) References Cited

U.S. PATENT DOCUMENTS

| | | | | |
|---|---|---|---|---|
| 10,384,870 | B2* | 8/2019 | Geiger | B66F 9/063 |
| 10,597,273 | B2* | 3/2020 | Sokuza | B66F 9/063 |
| 2007/0288123 | A1 | 12/2007 | D'Andrea | |
| 2013/0166108 | A1 | 6/2013 | Sturm | |
| 2020/0189623 | A1* | 6/2020 | Nishizawa | B61D 47/00 |

OTHER PUBLICATIONS

VDI 2510, VDI manual Material Flow and Conveyor Technology, vol. 2; "Automated Guided Vehicle Systems (AGVS)" Dusseldorf, Oct. 2005, pp. 1-39.

VDI 2510 Part 3, VDI Manual Technical Logistics, vol. 2: Industrial trucks; "Automated guided vehicle systems (AGVS) Interfaces to infrastructure and peripherals".

Düsseldorf, Sep. 2017, pp. 1-26.

VDI 2510 Part 2, VDI Manual Technical Logistics, vol. 2: Industrial trucks; "Automated guided vehicle systems (AGVS) Safety of AGVS".

Düsseldorf, Dec. 2013, pp. 1-19.

VDI 2510 Part 1, VDI manual Material Flow and Conveyor Technology, vol. 2: Industrial trucks VDI Manual Material Flow and Conveyor Technology, vol. 7: Material Flow I.

(Design), "Infrastructure and peripheral installations for Automated Guided Vehicle Systems (AGVS)" Düsseldorf, Dec. 2009, pp. 1-22.

* cited by examiner

DRIVERLESS TRANSPORT SYSTEM

CROSS-REFERENCE TO RELATED APPLICATIONS

This application claims priority to German Patent Application No. 10 2018 118 261.9 (DE 10 2018 118 261.9) filed on Jul. 27, 2018, the entire contents of which are hereby incorporated by reference.

DESCRIPTION

The present invention relates to a driverless transport system, as specified in the preamble of claim 1, with a plurality of driverless transport vehicles, each of which comprises a base structure having a chassis and a battery-operated travel drive and a load receiving means arranged above the base structure, wherein the load receiving means is supported on the base structure in a height-adjustable manner by means of a lifting device.

Driverless transport systems (hereinafter referred to as "DTS") and associated details are comprehensively described in the VDI-Guideline 2510. They typically consist mainly of the following components: Driverless transport vehicles (hereinafter referred to as "DTV"), master control, devices for location determination and position detection, devices for data transmission, and infrastructure and peripheral equipment. Special aspects, namely the infrastructure and peripheral equipment of such DTS, of associated interfaces and safety, are dealt with in detail in sheets 1, 2 and 3 of VDI-Guideline 2510.

DTS are enjoying steadily increasing popularity. There are many reasons for this. Their use is particularly supported by economic aspect, as they can be used, for example, to carry out standard transport tasks in the field of order picking at comparatively low cost. However, various other reasons can also be decisive in individual cases. For example, it may be possible to achieve significantly higher motion dynamics than with manned transport vehicles. In addition, transport tasks can be performed in an environment that is dangerous and/or harmful to the health of operators. Moreover, by eliminating an operator on the transport vehicle, its transport capacity and energy efficiency can be increased accordingly; or the transport vehicles can be correspondingly more compact with the same payload, which in turn benefits the usable area of the warehouse.

For various DTS applications, the DTVs must have height-adjustable load receiving means. Such height-adjustable load receiving means can be arranged at the front of the DTV in particular; such DTVs typically correspond to unmanned stacker trucks or forklifts (cf. FIG. 1 of VDI-Guideline 2510). However, the use of such DTVs often proves to be disadvantageous. On the one hand, economic efficiency suffers from the high weight of the base structure, which is required for safe lifting of loads and their safe transport; the result are comparatively short ranges and operating times of the DTVs.

Furthermore, when the load is arranged in front of the base structure, comparatively large traffic areas are required. Both of these disadvantages are avoided or are much less prominent if, as is the case with DTS of the generic kind, the load receiving means of the DTVs is arranged above the respective base structure, so that the load is carried "piggyback" as it were (cf. Picture 6, FIG. 2.2.2 "Lift table" of VDI-Guideline 2510). With this configuration, particularly light, compact, maneuverable and yet stable DTVs can be achieved. This in turn benefits the energetic efficiency of the DTS as well as the economic efficiency in other respects (required traffic area, driving dynamics).

DE 102011089858 A1, for example, is one of the relevant prior art document with regard to DTSs of the generic kind. US 2007/0288123 A1 is also relevant.

The present invention is based on the task of providing a DTS of the generic kind, which is characterized by a further increase in practical suitability compared to the prior art. In particular, the DTS is to be particularly space-efficient in the sense that its DTV—in the interest of a particularly large usable volume—only requires a minimum amount of space for the lifting device. The aim is also to achieve high reliability, high performance and maximum energy efficiency.

The above-mentioned problem is solved in accordance with the present invention in that, in a driverless transport system (DTS) of the generic kind, the lifting device of the at least one driverless transport vehicle (DTV) equipped with a height-adjustable load receiving means is configured electro-hydraulic and comprises a supply unit having a delivery direction-reversible hydraulic unit and at least three hydraulic lifting cylinders which are connected to the supply unit by means of a connection line arrangement, are oriented parallel to one another and are configured as differential cylinders, wherein the hydraulic lifting cylinders are dimensioned in a stepped manner in such a way that the piston rod working space of an n-th lifting cylinder and the piston working space of an (n+1)-th lifting cylinder, with n from 1 to z−1, wherein z indicates the number of hydraulic lifting cylinders of the lifting device, have the same effective area, the at least three lifting cylinders are connected hydraulically in series in such a manner that in each case the working spaces, which have the same effective area, are directly fluidically coupled by means of a hydraulic connection, and the piston working space of the first and the piston rod working space of the z-th lifting cylinder are in fluid connection with the connections of the delivery direction-reversible hydraulic unit.

Due to the hydraulic series connection of at the least three lifting cylinders—typically arranged in the area of the corners of a substantially rectangular load receiving means in the case of four lifting cylinders—which are configured as differential cylinders and their forced coupling realized in this way, the hydraulic lifting system can be configured to be particularly simple, space-saving and reliable at a particularly high performance density. The lifting and lowering movement can be controlled solely by controlling the delivery direction-reversible hydraulic unit for the required delivery direction; control valves serving to control or regulate the individual loading of the individual lifting cylinders can thus be omitted. The delivery direction-reversible configuration of the hydraulic unit is particularly preferably realized in that it has a reversible motor-pump unit; however, the invention also allows the use of hydraulic units where the reversal of the delivery direction is valve-controlled.

The above advantages are particularly noticeable when the hydraulic unit—with respect to different delivery rates— is equipped with a variable speed motor-pump unit. This results in the highest possible energy efficiency, which is a particularly significant advantage in view of the fact that the DTV is operated from a battery (both in terms of its locomotion and other functions). This allows the battery to be particularly compact and lightweight for a given usage profile, which in turn is advantageous with respect to the performance data of the DTV.

The DTS according to the invention is particularly suitable for various applications in which the DTVs have to be automatically loaded and unloaded at various heights above the driving surface and/or the DTVs drive under a load in order to lift it independently for subsequent transport and/or load is transferred from one DTV to another using transfer aids.

The weight advantage that can be achieved through the piggy-back arrangement of the load receiving means (see above) can be achieved to a particularly pronounced degree if the lifting cylinders of the lifting device are supported directly on wheel carriers associated with the base structure, so that four direct, shortest possible load paths lead from the load receiving means via the lifting cylinders and the wheel carriers/wheels to the driving surface. The base structure can thus be kept largely free from the forces resulting from the load outside the wheel carriers and can therefore be configured particularly light.

Preferably, the DTS comprises a control means (master control) to which the DTVs are connected via communication links, wherein the lifting device is controllable from the control means. Accordingly, in this configuration, there is not only communication between the DTVs and the control means with regard to the position of the individual DTVs and their locomotion, but also the operation of the lifting device of the respective DTV in the sense of lifting or lowering of the respective load receiving means is controlled (at least optionally) from the control means. In this way, there is the greatest possible flexibility with regard to the use of the DTVs, which is reflected in a particularly high time and energy efficiency.

Further preferably, the DTS according to the invention is configured so that the lifting cylinders of the DTV have an overflow device bridging the respective piston, which is active in the maximum retracted piston position, which corresponds to a lowest position of the load receiving means defined by mechanical stops, in the sense of a unidirectional hydraulic short circuit from the respective piston rod working space to the piston working space. In the maximum retracted piston position, these overflow devices allow a balancing of the two working spaces of the respective lifting cylinder in the direction of delivery from the piston rod working space to the piston working space respectively.

This balancing, in turn, permits regular comparison of the piston positions of the four lifting cylinders, i.e. their re-synchronisation. In this way—e.g. due to minor leakages or the like—stroke differences between the lifting cylinders are regularly neutralised automatically. A functional impairment due to successively increasing stroke differences is thus excluded. In addition, when all of the cylinders connected in series have reached their maximum retracted piston position, they can (regularly) be flushed with flow direction from the piston rod working space to the piston working space in order to expel possible air inclusions. This is extremely advantageous for the operating behaviour as it favours the optimum synchronisation of the lifting cylinders.

The overflow devices described above may be implemented in the cylinders of the lifting cylinders. However, it is particularly advantageous if the overflow devices are structurally integrated in the respective pistons, in particular if they each comprise a non-return valve group with two non-return valves acting in opposite directions, of which the non-return valve blocking the flow direction from the piston rod working space to the piston working space can be mechanically unblocked via a pilot. In the maximum retracted piston position, the pilot is actuated by hitting a corresponding stop surface fixed to the cylinder, opening the pilot-operated non-return valve and establishing the hydraulic connection between the two working spaces of the cylinder in question—with the flow direction from the piston rod working space to the piston working space. The only unidirectional hydraulic short-circuit has no effect on the lifting movement of the load receiving means; all lifting cylinders are starting synchronously.

Further preferably, in the DTS according to the invention, a hydraulically unblockable non-return valve is arranged in the connection of the piston working space of the first lifting cylinder to the associated connection of the hydraulic unit, the control connection of which is connected to the other connection of the hydraulic unit via a control line. The hydraulically unblockable non-return valve is a check valve which secures the load receiving means in the respectively specified raised position. A gradual sinking of the (loaded) load receiving means by displacement of hydraulic fluid through the hydraulic unit into the tank is effectively prevented. Also, no (occasional) supply of hydraulic fluid by means of the hydraulic unit is required in order to keep the load receiving means in its raised position, which in turn is essential for the energetic efficiency of the DTS and thus for the operating time of the DTVs with a given battery charge.

Another preferred further embodiment of the invention is characterized in that a throttle non-return valve is arranged in the connection of the piston working space of the first lifting cylinder with the hydraulically unblockable non-return valve described above, in such a way that the non-return valve opens when the load receiving means is lifted, but closes when the load receiving means is lowered. Thus, the throttle functionality is activated when the load receiving means is lowered, which accommodates jerk-free reversing during load change. Above all, however, the throttle functionality comes into play when the lowering movement is not induced by the hydraulic unit—operated with reversed delivery direction compared to the lifting mode—but by operating a manually operated shut-off valve arranged in a tank line which branches off from the connection of the hydraulically unblockable non-return valve with the throttle non-return valve.

In the following, this invention is explained in more detail using a preferred embodiment illustrated in the drawings, wherein.

Figure 1:
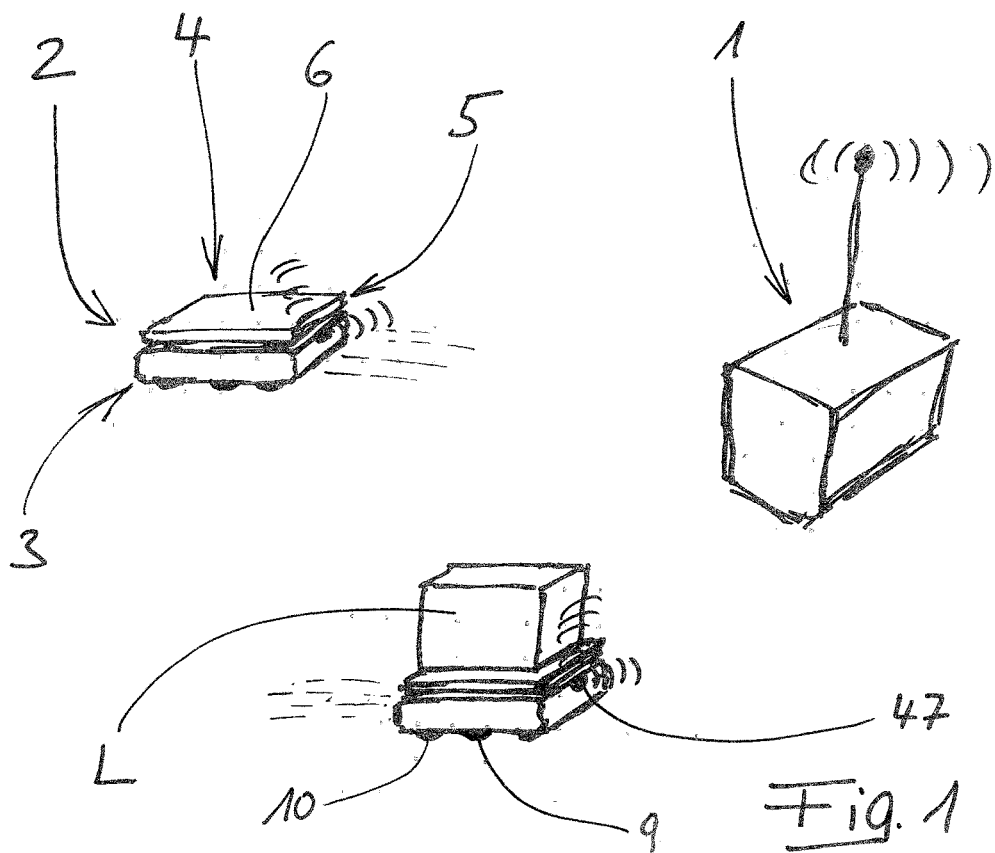
FIG. 1 shows a schematic representation of a driverless transport system.

The driverless transport system (DTS) shown in FIG. 1 comprises, as is known as such from the prior art, a control means 1 and several driverless transport vehicles (DTVs). A data exchange takes place between the DTVs 2 and the control means 1 via a wireless communication link.

The DTVs 2 each have, as also known as such, a base structure 3 with a roughly flat-cuboid basic shape and a load receiving means 4 arranged above it. The load receiving means 4 is configured, for example, as a lifting table 5 with a plate 6 serving to support a load L and extending largely over the extension of the base structure 3; however, as is well known, individual adaptations of the load receiving means 4 to specific loads L are possible.

Figure 2:
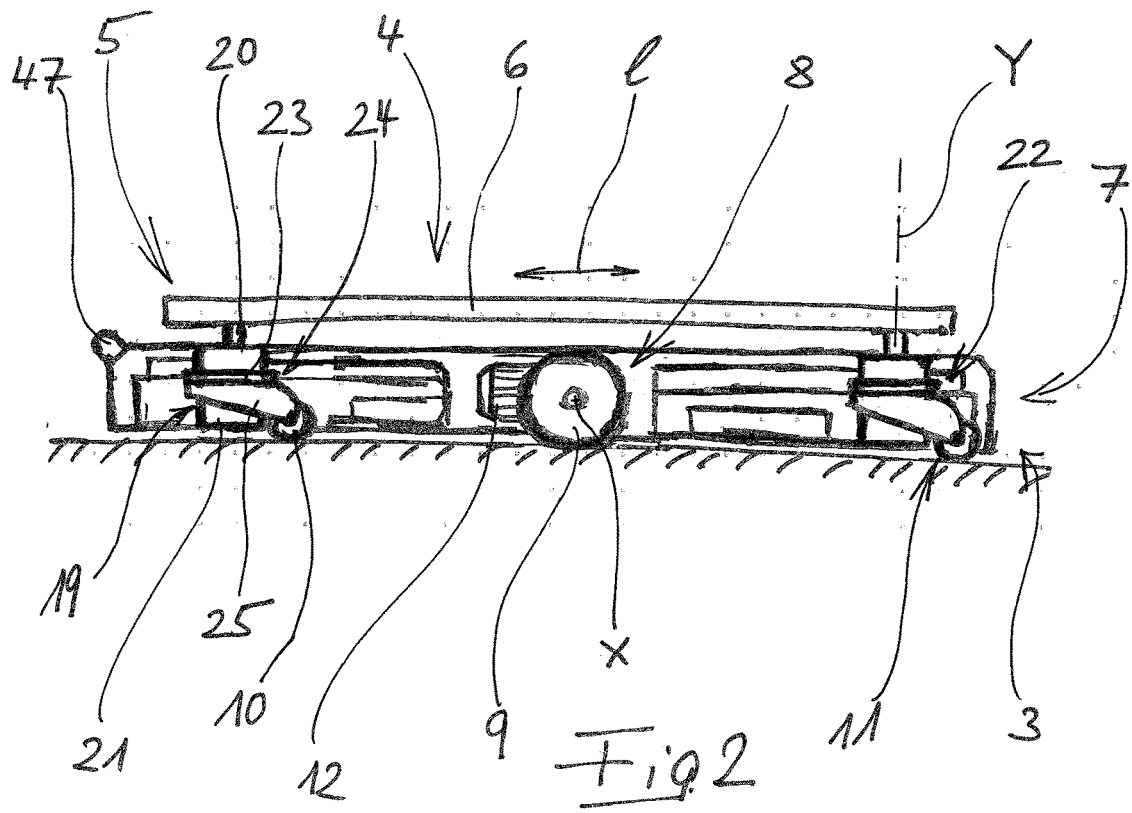
FIG. 2 shows, also in partly schematic representation, the construction of a driverless transport vehicle of the driverless transport system according to FIG. 1.
Figure 3:
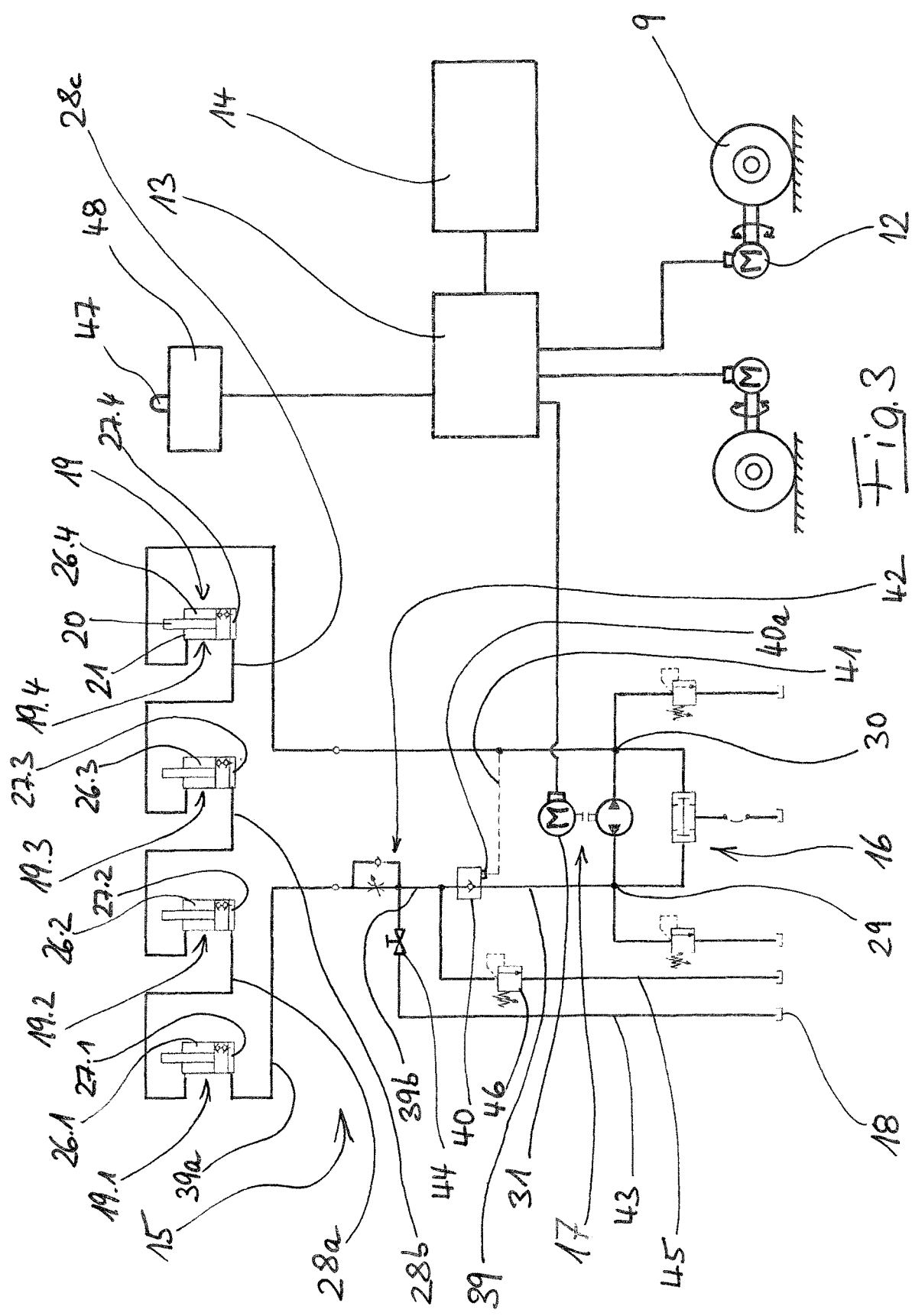
FIG. 3 shows the complete circuit diagram for the driverless transport vehicle according to FIG. 2

According to the illustration of one of the DTVs 2 in FIG. 2 and the corresponding complete circuit diagram according to FIG. 3, the base structure 3 of the DTV 2 comprises, also in a manner known as such, a chassis 7 and a battery-operated travel drive 8. The chassis 7—with the embodiment of the invention illustrated here; any other chassis configurations, in particular those according to VDI-Guideline 2510 including chassis with Mecanum drive, are possible as an alternative—two drive wheels 9 and four support wheels 10. The support wheels 10 are arranged adjacent to the corners of the base structure 3; they are configured as passive castors 11. The two drive wheels 9 are located close to the left and right lateral contours of the base structure 3, approximately in the middle of the respective longitudinal side of the chassis 7. They are rotatable about a common, stationary axis X extending transversely to the longitudinal direction 1 of the DTV and may be spring-mounted to provide a predetermined pressure force on the ground. The travel drive 8 comprises two independent electric drive motors 12, wherein one electric drive motor 12 acts on each of the two drive wheels 9.

The two electric drive motors 12—controlled by a DTV control 13—are supplied from an accumulator 14. In this respect, there is a differential drive as defined by VDI-Guideline 2510, which—by corresponding control of the two electric drive motors 12—allows straight ahead driving (forwards and backwards) and curve driving of the DTV 2 and its turning on the spot.

The lifting table 5 of the DTV 2 is supported on the base structure 3 in a height-adjustable manner by means of a lifting device 15. The lifting device 15 is configured electrohydraulic. It comprises a supply unit, which in turn comprises a hydraulic unit 16 with a reversible and variable speed motor-pump unit 17 and a hydraulic fluid storage tank 18. The lifting device 15 also comprises four hydraulic lifting cylinders 19 configured as differential cylinders. These are arranged with working axes Y, which are parallel to one another and vertically oriented, in such a way that the respective piston rod 20 is connected to the plate 6 of the lifting table 5, while the respective cylinder part 21 is connected to the base structure 3 in a force-transmitting manner. An arrangement has been selected in which the lifting cylinders 19 of the lifting device 15 are supported directly on wheel carriers 22 assigned to the base structure 3, i.e. are connected directly to the wheel carriers 22 in a load-bearing manner. The cylinder parts 21 of the lifting cylinders 19 are each firmly connected to the upper ring 23 of a rotary bearing 24, the lower ring of which, which is rotatable about an axis vertical to the upper ring 23, coinciding with the vertical axis Y of the associated lifting cylinder 19, is integrated into the wheel carrier fork 25 supporting the respective support wheel 10.

The four hydraulic lifting cylinders 19 are dimensioned in a stepped manner in such a way that the piston rod working space 26.1 of the first lifting cylinder 19.1 and the piston working space 27.2 of the second lifting cylinder 19.2, the piston rod working space 26.2 of the second lifting cylinder 19.2 and the piston working space 27.3 of the third lifting cylinder 19.3 and the piston rod working space 26.4 of the third lifting cylinder 19.3 and the piston working space 27.4 of the fourth lifting cylinder 19.4 respectively have the same effective area. The four lifting cylinders 19.1, 19.2, 19.3 and 19.4 are hydraulically connected in series in such a way that, via hydraulic connections 28a, 28b and 28c, respectively, the piston rod working space 26.1 of the first lifting cylinder is directly coupled to the piston working space 27.2 of the second lifting cylinder 19.2, the piston rod working space 26.2 of the second lifting cylinder 19.2 is directly coupled to the piston working space 27.3 of the third lifting cylinder 19.3 and the piston rod working space 26.3 of the third lifting cylinder 19.3 is directly coupled to the piston working space 27.4 of the fourth lifting cylinder 19.4. The piston working space 27.1 of the first lifting cylinder 19.1 and the piston rod working space 26.4 of the fourth lifting cylinder 19.4 are connected to the connections 29, 30 of the delivery direction-reversible hydraulic unit 16. Depending on the delivery direction of the hydraulic unit 16, the piston rods 20 of the four lifting cylinders 19, which are forcibly hydraulically coupled in this way, extend or retract synchronously and equidistantly, wherein the lifting or lowering speed can be adjusted by changing the speed of the motor 31 of the motor-pump unit 17.

Figure 4:
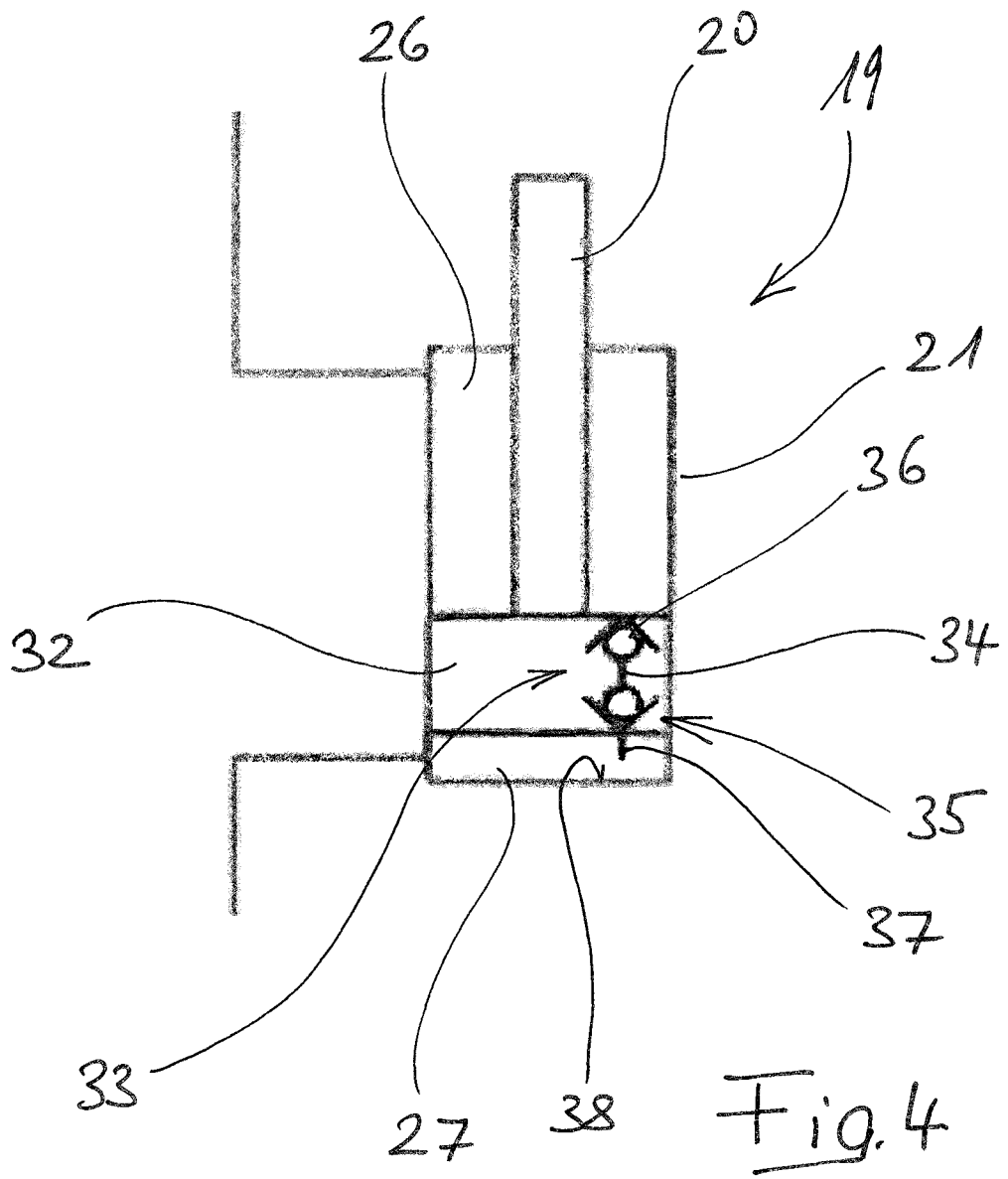
FIG. 4 shows a detail of the complete circuit diagram according to FIG. 3 in enlarged view.

As shown in the detail in FIG. 4, each of the four lifting cylinders 19 has an overflow device 33 bridging the respective piston 32. The overflow device 33 is configured as a non-return valve group 35 integrated structurally into the piston 32, namely into an overflow bore 34 which is connecting the piston working space 27 and the piston rod working space 26, respectively. The non-return valve group 35 comprises two non-return valves 36 acting in opposite directions. The non-return valve blocking the flow direction from the piston rod working space 26 to the piston working space 27—arranged at the bottom here—is mechanically unblockable via a pilot 37. Immediately before the maximum retracted piston position, the pilot 37 hits the piston bottom 38, thus unidirectionally opening the overflow bore 34 of the respective lifting cylinder 19 in the direction of flow from piston rod working space 26 to piston working space 27. The (lowest) position of the load receiving means 4 is defined by mechanical stops.

In connection 39 of the piston working space 27.1 of the first lifting cylinder 19.1 with the associated connection 29 of the hydraulic unit 16 a hydraulically unblockable non-return valve 40 is arranged. Its control port 40a is connected to the other connection 30 of the hydraulic unit 16 via a control line 41. Furthermore, a throttle non-return valve 42 is arranged in connection 39a of the piston working space 27.1 of the first lifting cylinder 19.1 with the hydraulically unblockable non-return valve 40. And from connection 39b of the hydraulically unblockable non-return valve 40 with the throttle non-return valve 42, a tank line 43 with a manually operated shut-off valve 44 and—as overload protection—a further tank line 45 with a pressure relief valve 46 branch off.

In accordance with the complete circuit diagram according to FIG. 3, the accumulator 14—controlled via the DTV control 13—supplies both the two electric drive motors 12 and the electric motor 31 of the hydraulic unit 16. The DTV control 13 thus controls both the travel function and the lifting function of the DTV 2. With regard to both functionalities, a bidirectional data exchange of the respective DTV 2 with the control unit 1 takes place, namely on the DTV side via the communication module 48, which is connected to the DTV control unit 13 and equipped with a wireless transmission and reception device 47.

The invention claimed is:

1. A Driverless transport system comprising:
   a plurality of driverless transport vehicles; and
   a control means with which the transport vehicles are connected via communication links, wherein
   each of said plurality of driverless transport vehicles includes at least a base structure having a chassis and a battery-operated travel drive and a load receiving means arranged above the base structure,
   the load receiving means of at least one driverless transport vehicle of said plurality of driverless transport vehicles is supported on the base structure in a height-adjustable manner by means of a lifting device, the lifting device is configured electro-hydraulic,
the lifting device comprises a supply unit which has a delivery direction-reversible hydraulic unit and at least three hydraulic lifting cylinders which are connected to the supply unit by means of a connection line arrangement, are oriented parallel to one another and are configured as differential cylinders,
the hydraulic lifting cylinders are dimensioned in a stepped manner in such a way that the piston rod working space of an n-th lifting cylinder and the piston working space of an (n+1)-th lifting cylinder, with n from 1 to z−1, wherein z indicates the number of hydraulic lifting cylinders of the lifting device, have the same effective area,
the at least three lifting cylinders are hydraulically connected in series in such a manner that in each case the working spaces, which have the same effective area, are directly fluidically coupled by means of a hydraulic connection,
the piston working space of the first lifting cylinder and the piston rod working space of the z-th lifting cylinder are in fluid connection with the connections of the delivery direction-reversible hydraulic unit,
the hydraulic unit has a reversible and variable-speed motor-pump unit,
the lifting device is controllable from the control means,
the lifting cylinders have an overflow device bridging the respective piston, which is active in the maximum retracted piston position, which corresponds to a lowest position of the load receiving means defined by mechanical stops, in the sense of a unidirectional hydraulic short circuit from the respective piston rod working space to the piston working space,
the overflow devices are structurally integrated in the respective pistons, and
each of said the overflow devices comprise a non-return valve group with a non-return valve which is mechanically unblockable via a pilot.

2. The Driverless transport system according to claim 1, further comprising:
a hydraulically unblockable non-return valve is arranged in the connection of the piston working space of the first lifting cylinder with the associated connection of the hydraulic unit, the control connection of which is in fluid connection with the other connection of the hydraulic unit via a control line.

3. The Driverless transport system according to claim 2, further comprising:
a throttle non-return valve is arranged in the connection between the piston working space of the first lifting cylinder and the hydraulically unblockable non-return valve.

4. The Driverless transport system according to claim 3, further comprising:
a tank line with a manually operable shut-off valve branches off from the connection between the hydraulically unblockable non-return valve and the throttle non-return valve.

5. The Driverless transport system according to claim 4, further comprising:
a tank line with a pressure relief valve branches off from the connection of the hydraulically unblockable non-return valve with the throttle non-return valve.

6. A Driverless transport system comprising:
a plurality of driverless transport vehicles, wherein
each of said plurality of driverless transport vehicles includes at least a base structure having a chassis and a battery-operated travel drive and a load receiving means arranged above the base structure,
the load receiving means of at least one driverless transport vehicle of said plurality of driverless transport vehicles is supported on the base structure in a height-adjustable manner by means of a lifting device,
the lifting device is configured electro-hydraulic,
the lifting device comprises a supply unit which has a delivery direction-reversible hydraulic unit and at least three hydraulic lifting cylinders which are connected to the supply unit by means of a connection line arrangement, are oriented parallel to one another and are configured as differential cylinders,
the hydraulic lifting cylinders are dimensioned in a stepped manner in such a way that the piston rod working space of an n-th lifting cylinder and the piston working space of an (n+1)-th lifting cylinder, with n from 1 to z−1, wherein z indicates the number of hydraulic lifting cylinders of the lifting device, have the same effective area,
the at least three lifting cylinders are hydraulically connected in series in such a manner that in each case the working spaces, which have the same effective area, are directly fluidically coupled by means of a hydraulic connection,
the piston working space of the first lifting cylinder and the piston rod working space of the z-th lifting cylinder are in fluid connection with the connections of the delivery direction-reversible hydraulic unit,
a control means with which the transport vehicles are connected via communication links, wherein
the lifting device is controllable from the control means,
the lifting cylinders have an overflow device bridging the respective piston, which is active in the maximum retracted piston position, which corresponds to a lowest position of the load receiving means defined by mechanical stops, in the sense of a unidirectional hydraulic short circuit from the respective piston rod working space to the piston working space,
the overflow devices are structurally integrated in the respective pistons, and
each of said the overflow devices comprise a non-return valve group with a non-return valve which is mechanically unblockable via a pilot;
a hydraulically unblockable non-return valve is arranged in the connection of the piston working space of the first lifting cylinder with the associated connection of the hydraulic unit, the control connection of which is in fluid connection with the other connection of the hydraulic unit via a control line;
a throttle non-return valve is arranged in the connection between the piston working space of the first lifting cylinder and the hydraulically unblockable non-return valve;
a tank line with a manually operable shut-off valve branches off from the connection between the hydraulically unblockable non-return valve and the throttle non-return valve;
a tank line with a pressure relief valve branches off from the connection of the hydraulically unblockable non-return valve with the throttle non-return valve, wherein
the hydraulic unit has a reversible and variable-speed motor-pump unit.

7. The Driverless transport system according to claim 1, wherein
the lifting cylinders of the lifting device are supported directly on wheel carriers.

8. The Driverless transport system according to claim 1, wherein
the lifting cylinders have an overflow device bridging the respective piston, which is active in the maximum retracted piston position, which corresponds to a lowest position of the load receiving means defined by mechanical stops, in the sense of a unidirectional hydraulic short circuit from the respective piston rod working space to the piston working space.

9. The Driverless transport system according to claim 1, further comprising:
a hydraulically unblockable non-return valve is arranged in the connection of the piston working space of the first lifting cylinder with the associated connection of the hydraulic unit, the control connection of which is in fluid connection with the other connection of the hydraulic unit via a control line.

10. The Driverless transport system according to claim 3, further comprising:
a tank line with a pressure relief valve branches off from the connection of the hydraulically unblockable non-return valve with the throttle non-return valve.

11. The Driverless transport system according to claim 1, wherein
the hydraulic unit has a reversible and variable-speed motor-pump unit.

12. A lifting device comprising:
a supply unit; and
a control means, wherein
the supply unit has a delivery direction-reversible hydraulic unit; and
at least three hydraulic lifting cylinders, wherein
said at least three hydraulic lifting cylinders are connected to the supply unit by means of a connection line arrangement,
said at least three hydraulic lifting cylinders are oriented parallel to one another, and
said at least three hydraulic lifting cylinders are configured as differential cylinders,
the hydraulic lifting cylinders are dimensioned in a stepped manner in such a way that the piston rod working space of an n-th lifting cylinder and the piston working space of an (n+1)-th lifting cylinder, with n from 1 to z−1, wherein z indicates the number of hydraulic lifting cylinders of the lifting device, have the same effective area,
the at least three lifting cylinders are hydraulically connected in series in such a manner that in each case the working spaces, which have the same effective area, are directly fluidically coupled by means of a hydraulic connection;
the piston working space of the first lifting cylinder and the piston rod working space of the z-th lifting cylinder are in fluid connection with the connections of the delivery direction-reversible hydraulic unit,
the hydraulic unit has a reversible and variable-speed motor-pump unit,
the lifting device is controllable from the control means,
the lifting cylinders have an overflow device bridging the respective piston, which is active in the maximum retracted piston position, which corresponds to a lowest position of the load receiving means defined by mechanical stops, in the sense of a unidirectional hydraulic short circuit from the respective piston rod working space to the piston working space,
the over-low devices are structurally integrated in the respective pistons, and
each of said the overflow devices comprise a non-return valve group with a non-return valve which is mechanically unblockable via a pilot.

* * * * *